United States Patent
Sugawara (10) Patent No.: US 9,667,140 B2
(45) Date of Patent: May 30, 2017

(54) SWITCHING POWER SUPPLY CIRCUIT THAT AVOIDS OVERHEATING DURING A SHORT-CIRCUIT

(71) Applicant: FUJI ELECTRIC CO., LTD., Kawasaki-shi (JP)

(72) Inventor: Takato Sugawara, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 124 days.

(21) Appl. No.: 14/504,943

(22) Filed: Oct. 2, 2014

(65) Prior Publication Data
US 2015/0137784 A1  May 21, 2015

(30) Foreign Application Priority Data
Nov. 21, 2013 (JP) ................ 2013-241383

(51) Int. Cl.
*H02M 3/156* (2006.01)
*H02M 1/32* (2007.01)
*H02M 1/42* (2007.01)
H02M 1/36 (2007.01)

(52) U.S. Cl.
CPC ............ *H02M 3/156* (2013.01); *H02M 1/32* (2013.01); *H02M 1/4225* (2013.01); *H02M 1/36* (2013.01); *Y02B 70/126* (2013.01)

(58) Field of Classification Search
CPC .......... H02M 3/156; H02M 2001/322; H02M 7/217; H02M 3/158; H02M 1/4225; H02M 1/32; H02M 1/36
See application file for complete search history.

(56) References Cited

U.S. PATENT DOCUMENTS

| 5,815,387 A * | 9/1998 | Aritsuka ............... H02J 3/1814 361/100 |
| 2006/0033480 A1 | 2/2006 | Soldano |
| 2008/0316779 A1 | 12/2008 | Jayaraman et al. |
| 2010/0110593 A1* | 5/2010 | Kim ........................ H02M 1/32 361/18 |
| 2013/0223120 A1* | 8/2013 | Dragojevic ............. H02M 7/06 363/126 |
| 2013/0249520 A1* | 9/2013 | Oikarinen ............. H02M 3/158 323/285 |
| 2015/0048691 A1* | 2/2015 | Navarro ................... H02J 9/062 307/113 |
| 2015/0062768 A1* | 3/2015 | Prescott .................. H02M 1/32 361/86 |

* cited by examiner

*Primary Examiner* — Gustavo Rosario Benitez
(74) *Attorney, Agent, or Firm* — Rossi, Kimms & McDowell LLP (57) ABSTRACT

A switching power supply circuit includes a semiconductor switching element that is ON/OFF-controlled and controls current through an inductance, an output capacitor that stores power delivered from the inductance through a boost diode, a bypass diode that bypasses the inductance and delivers a DC voltage given to the inductance to the output capacitor, and a switching control section that ON/OFF-controls the semiconductor switching element. The switching power supply circuit includes in particular, an operation frequency reducing means that detects variation of the voltage generated on short-circuit of the bypass diode and lowers a switching frequency of the semiconductor switching element.

8 Claims, 5 Drawing Sheets

SWITCHING POWER SUPPLY CIRCUIT THAT AVOIDS OVERHEATING DURING A SHORT-CIRCUIT

CROSS-REFERENCE TO RELATED APPLICATION

This application is based on, and claims priority to, Japanese Patent Application No. 2013-241383, filed on Nov. 21, 2013, the entire contents of which are incorporated herein by reference.

BACKGROUND OF THE INVENTION

Field of the Invention

Embodiment of the present invention relate to a switching power supply circuit which prevents a boost diode in a chopper circuit from breakdown due to overheating even in an event of short-circuit in a bypass diode that bypasses the circuit between the input side terminal and the output side terminal of the chopper circuit.

Discussion of the Background

Figure 4:
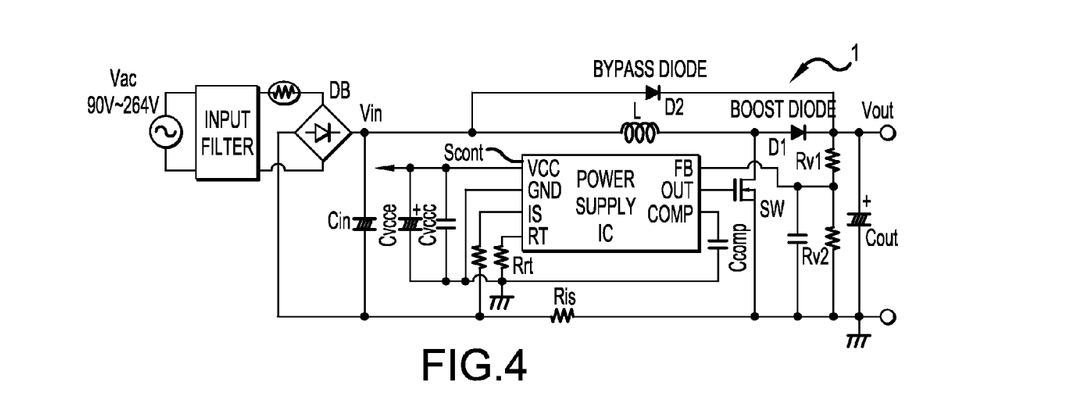
FIG. 4 shows a schematic construction of a switching power supply circuit of a critical mode power factor correction (PFC) type.

A critical mode power factor correction (PFC) type switching power supply circuit is known as a DC power supply device for use in a power supply section of a variety of electronic devices. FIG. 4 shows a schematic construction of this type of switching power supply circuit 1. This switching power supply circuit 1 has a construction of a chopper circuit of a boost type comprising an inductance L receiving a DC voltage Vin, and a semiconductor switching element (also referred to simply as a switching element) SW for controlling the current running through the inductance L.

The switching element SW is ON/OFF-controlled by a switching control section Scont, which is a power supply IC. An AC voltage Vac is full wave rectified by a diode bridge circuit DB and then smoothed with an input capacitor Cin to obtain the DC voltage Vin for supplying to the inductance L. A DC voltage Vout is obtained from the inductance L through a boost diode D1 and stored in an output capacitor Cout, and then delivered to a load (not shown in the figure).

Voltage dividing resistors Rv1 and Rv2 in FIG. 4 detect the output voltage Vout, which is a voltage across the output capacitor Cout, of the switching power supply circuit 1, and feed-back a detected feedback voltage to the switching control section Scont. A shunt resistor Ris detects the output current Is of the switching power supply circuit 1. A resistor Rrt adjusts the gradient of a ramp wave signal for PWM control, which will be described below. The resistance values of the resistors Rv1, Rv2, Ris, and Rrt are determined corresponding to specifications of the output power of the switching power supply circuit 1.

The switching control section Scont ON/OFF-controls the switching element SW using a pulse signal P corresponding to the output power, or output voltage Vout, to the load. Upon turning ON of the switching element SW, the current through the inductance L rises from zero. Upon turning OFF of the switching element SW, the current through the inductance L falls to zero. Thus, the switching control section Scont works as a chopper.

The chopper circuit has a bypass diode D2 between the input terminal and the output terminal thereof. The bypass diode D2 allows the DC voltage Vin onto the inductance L to bypass the inductance L and the boost diode D1, and applies the DC voltage Vin to the output capacitor Cout. The bypass diode D2 avoids overheat breakdown caused by overcurrent through the boost diode D1 in startup period of the chopper circuit.

In the startup period of the chopper circuit, the output capacitor Cout has no stored charges, and the output voltage Vout is at zero volts. If an AC input voltage is applied to the chopper circuit without the bypass diode D2, a large charging current flows from the inductance L through the boost diode D1 to the output capacitor Cout. This charging current would cause overheat breakdown of the boost diode D1. When the bypass diode D2 is provided, however, the charging current to the output capacitor Cout flows through the bypass diode D2. Thus, the boost diode D1 is protected against overheat breakdown due to the charging current.

The bypass diode D2 used has a greater rated current carrying capacity than the boost diode D1 so that the boost diode D1 does not break down due to the charging current. The bypass diode D2 is used only at the start up time of the chopper circuit, and not used in the ON/OFF-control period of the switching element SW. Thus, the bypass diode D2 can exhibit a long reverse recovery time.

Thus, in operation of the chopper circuit, the boost diode D1, which exhibits a short reverse recovery time, works in the ON/OFF-control period of the switching element SW, and the bypass diode D2, which exhibits a large rated current carrying capacity, works at the start up time of the chopper circuit. Therefore, a switching power supply circuit 1 that exhibits both high reliability and high efficiency can be constructed by providing the bypass diode D2. A switching power supply 1 having such a construction is disclosed in detail in United States Patent Application Publication No. 2006/0033480 and United States Patent Application Publication No. 2008/0316779, for example.

Figure 5A:
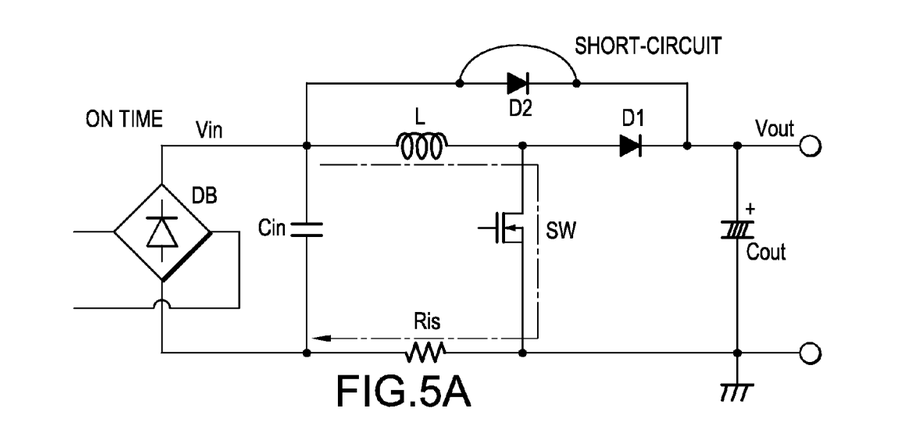
FIGS. 5A, 5B and 5C illustrate the current that flows in the event of bypass diode short-circuit.
Figure 5B:
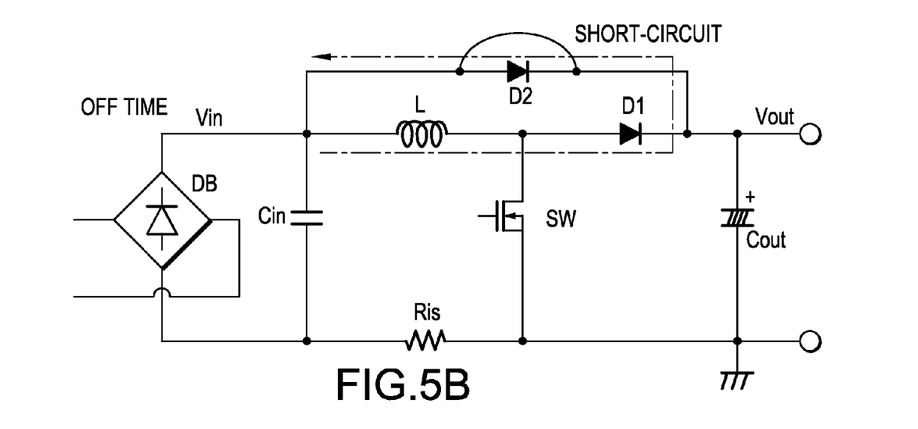

When the bypass diode D2 is short circuited, an electric current flows, as shown in FIG. 5A, from the inductance L through the switching element SW in the ON period of the switching element SW. In the OFF period of the switching element SW, as shown in FIG. 5B, the energy stored in the inductance L flows through the bypass diode D2.

Thus, in turning OFF time of the switching element SW, the current through the current detection resistor Ris, which is connected to the switching element SW in series, is rapidly interrupted. This results in earlier timing of zero current detection through the resistor Ris for performing the control to reduce energy loss in the switching element SW. This in turn results higher switching frequency for the switching element SW.

In this time, the output voltage Vout across the capacitor Cout is suppressed low regulated with the input voltage Vin through the short-circuited bypass diode D2. Thus, the switching control section Scont executes PWM control to expand the ON width of the pulse signal P in order to increase power delivery to the output capacitor Cout. This increases the current flowing in the switching element SW, and makes the overcurrent detection function for the switching element SW into action to turn OFF the switching element SW.

Figure 6A:
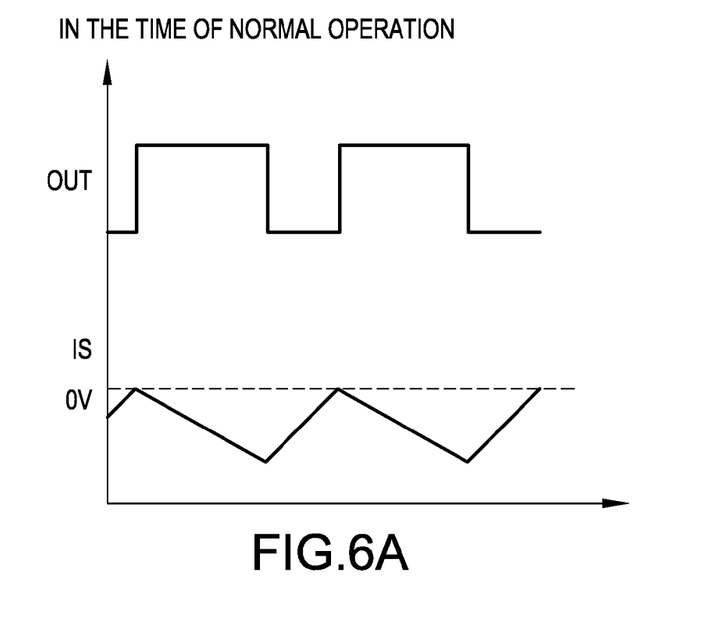
FIGS. 6A and 6B show waveforms to illustrate difference in the IS terminal voltage in normal operation and in the event of bypass diode short-circuit.
Figure 6B:
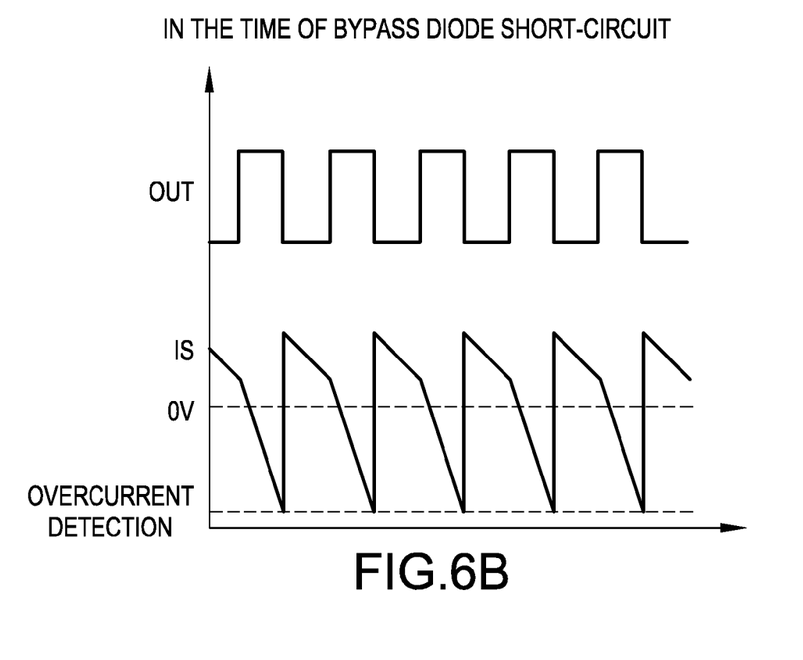

Consequently, when the bypass diode D2 is short-circuited, the switching element SW continuously operates as shown in FIG. 6B at a higher oscillation frequency than in the normal operation period sown in FIG. 6A. This continuous operation at a higher oscillation frequency than in the normal operation period is conducted at the maximum ON width under the limited ON width of the switching element SW due to overcurrent detection.

In this switching operation of the switching element SW, a DC current flowing through the bypass diode D2 is superimposed on the current delivered to the output capacitor Cout through the boost diode D1. This increases the current flowing through the boost diode D1 and may cause abnormal heating of the boost diode D1. To cope with this abnormal heating of the boost diode D1, it could be considered to use a plurality of parallel connected diodes or to use a diode with a higher rated current carrying capacity than normally required current carrying capacity. These measures, however, are costly.

SUMMARY OF THE INVENTION

Embodiments of the present invention provide a switching power supply circuit with a simple construction that prevents a semiconductor switching element from continuous operation at a high oscillation frequency in an event of short circuit of a bypass diode, and that avoids abnormal heating of a boost diode.

A switching power supply circuit according to an embodiment of the invention comprises: an inductance to which a DC voltage is applied; a semiconductor switching element that is ON/OFF-controlled and controls electric current flowing through the inductance; an output capacitor that stores power delivered from the inductance through a boost diode and delivers the power to a load; a switching control section that ON/OFF-controls the semiconductor switching element, and increases the current flowing through the inductance from zero in an ON state of the semiconductor switching element and decreases the current flowing through the inductance to zero in an OFF state of the semiconductor switching element; a bypass diode that bypasses the inductance when an output voltage stored in the output capacitor decreases and delivers a DC voltage given to the inductance to the output capacitor; and an operation frequency reducing means that detects short-circuit of the bypass diode based on current flowing through the semiconductor switching element after turning OFF of the semiconductor switching element, and reduces a switching frequency of the semiconductor switching element upon short circuit detection.

A switching power supply circuit according to an embodiment of the invention is a switching power supply circuit of a critical mode power factor correction (PFC) type having a maximum oscillation frequency limiting function that comprises an operation frequency reducing means in which a time period is set to suspend operation of the semiconductor switching element, thereby reducing effective, or averaged, switching frequency.

The switching control section may provide a critical mode power factor correction function in which the output voltage from the output capacitor is detected and the current flowing through the inductance is detected, and the switching frequency of the semiconductor switching element is varied.

The operation frequency reducing means comprises a bypass diode short-circuit detection circuit that detects short-circuit of the bypass diode based on the direction of the current flowing through the semiconductor switching element, and a bypass diode short-circuit protection circuit that inhibits, for a predetermined period of time, generation of pulse signal for ON/OFF-controlling the semiconductor switching element according to an output of the bypass diode short-circuit detection circuit.

The bypass diode short-circuit protection circuit may be an output control means that suspends, for a predetermine period of time, application to the semiconductor switching element, of a pulse signal that is delivered from the switching control section and ON/OFF-controls the semiconductor switching element.

In embodiments of the present invention, the short-circuit of the bypass diode is detected from the voltage generated by the current that flows through the semiconductor switching element after the semiconductor switching element turns OFF, in particular, from the polarity of the voltage generated corresponding to the direction of the current through the semiconductor switching element. A switching power supply circuit according to an embodiment of the invention comprises an operation frequency reducing means that reduces switching frequency of the semiconductor switching element when the short-circuit of the bypass diode is detected. Thus, the effective, or averaged, switching frequency of the semiconductor switching element is reduced when the short-circuit of the bypass diode is detected. Therefore, average current through the boost diode is restricted effectively avoiding abnormal heating of the diode.

Because the current itself through the boost diode is restricted, a conventional means for avoiding abnormal heating is not necessary, such as use of a plurality of parallel connected diodes or use of diode with a higher rated current carrying capacity than normally required current carrying capacity. When the operation frequency reducing means is actualized by the control circuit incorporated in the switching control section that is a power supply IC, for example, the abnormal heating of the boost diode can be effectively avoided with little change of circuit construction, or circuit scale, of the existing power supply IC.

DETAILED DESCRIPTION OF ILLUSTRATED EMBODIMENTS

A switching power supply circuit 1 according to an embodiment of the present invention will be described in detail in the following with reference to the accompanying drawings.

Figure 1:
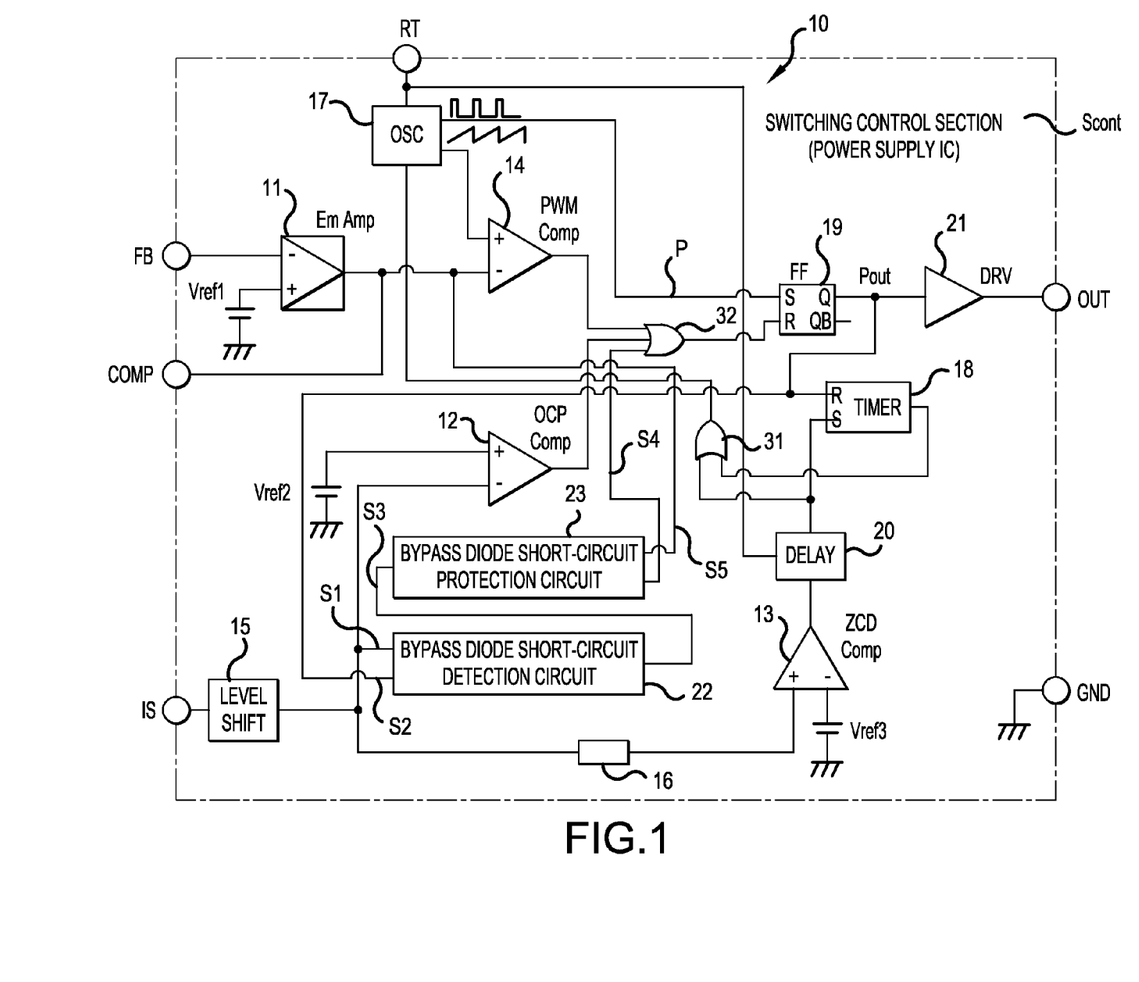
FIG. 1 shows a schematic construction of a switching control section of a switching power supply circuit according to an embodiment of the invention.

A switching power supply circuit 1 according to an embodiment of the present invention may be a critical mode power factor correction (PFC) type DC to DC converter provided with a maximum oscillation frequency limiting function as shown in FIG. 4. The switching power supply circuit 1 of the invention comprises a switching control section Scont for ON/OFF-controlling a semiconductor switching element SW to control the current through an inductance L. The switching control section Scont of a switching power supply circuit 1 according to an embodiment of the invention is characterized by such a construction as shown in FIG. 1, for example. This switching control section Scont is provided with an output voltage control function to control an output voltage Vout at a constant value by PWM control, which is a frequency control, of the pulse signals for the ON/OFF-control of the switching element SW. The switching control section Scont is actualized as a power supply IC 10 provided with a maximum oscillation frequency limiting function and an overcurrent detecting function, for example.

The overall basic construction of the DC to DC converter, which is a switching power supply circuit 1, has been described above. Thus, further repeated description is avoided.

The power supply IC 10, which is an actual construction of the switching control section Scont, basically ON/OFF-controls the switching element SW receiving the output voltage Vout detected through voltage dividing resistors Rv1 and Rv2, and an output current Is detected through a shunt resistor Ris. The power supply IC 10 comprises, as shown in FIG. 1, an amplifier 11 for detecting the output voltage, a first comparator 12 for detecting an overcurrent, a second comparator 13 for detecting zero current, and a third comparator 14 for PWM control. The first comparator 12 performs the overcurrent detecting function. The third comparator 14 performs pulse width modulation control of the pulse signal Pout for ON/OFF-control of the switching element SW.

The voltage corresponding to the output current Is that is detected as a voltage drop across the resistor Ris shown in FIG. 4 is given to the power supply IC 10 through a level shift circuit 15. The current detecting voltage indicating the output current Is is given to the first comparator 12 for overcurrent detection and simultaneously, given to the second comparator 13 after filtering through a filter circuit 16 for zero current detection.

The amplifier 11 outputs a voltage at a level corresponding to the voltage difference between (a) the feedback voltage detected by dividing the charged voltage, which is the output voltage Vout, across the output capacitor Cout through the voltage dividing resistors Rv1 and Rv2 shown in FIG. 4, and (b) the reference voltage Vref1 set preliminarily. Because the amplifier 11 is of an inverting type, the output voltage level of the amplifier 11 is lower for the feedback voltage that is higher than the reference voltage Vref1. The amplifier 11 delivers a higher voltage level for feedback voltage that is lower than the reference voltage Vref1.

The amplifier 11 raises the output voltage level in a heavy load condition with a low output voltage Vout, when the power consumption in the load is large and the drop of the output voltage Vout is large. Conversely, when the power consumption in the load is small and the drop of the output voltage Vout is small, which is a case of light load condition and a high output voltage Vout, the amplifier 11 lowers the output voltage level. The output voltage from the amplifier 11 changing its level corresponding to the output voltage Vout is smoothed with the capacitor Ccomp attached at the outside the power supply IC 10 as indicated in FIG. 4. The output voltage from the amplifier 11 is also given to the third comparator 14 for PWM control as a reference voltage for comparison with a ramp wave signal, which will be described below.

An oscillator 17 for generating a ramp wave signal for PWM control determines the gradient of the ramp wave signal, which is a rate of level increase of the signal, according to the resistance value of the resistor Rrt. The oscillator 17 zero-resets the ramp wave signal receiving a zero current detection signal delivered from the second comparator 13 or an output signal from a restart timer circuit 18, which will be described below. The oscillator 17 generates the ramp wave signal starting at the timing of reset elimination. The zero reset of the oscillator 17 cuts off the ramp wave signal generating a saw-tooth waveform and determines one period of the ramp wave signal. The oscillator 17 delivers the pulse signal P in synchronous with the timing of generating the ramp wave signal for setting a flip-flop circuit 19.

The third comparator 14 for PWM control compares the ramp wave signal delivered from the oscillator 17 with the output voltage of the amplifier 11, which is a comparison reference voltage corresponding to the output voltage Vout. The third comparator 14 delivers a reset signal for the flip-flop circuit 19 every time the level of the ramp wave signal exceeds the comparison reference voltage from the amplifier 11. The flip-flop circuit 19 also receives a reset signal of the overcurrent detection signal from the first comparator 12 through an OR circuit 32.

More specifically, when the load condition is heavy and the level of the comparison reference voltage from the amplifier 11 is high, the third comparator 14 maintains the output thereof at an L level for a long period until the level of the ramp wave signal reaches the level of the comparison reference voltage. After that, the output of the third comparator 14 is inverted to an H level. Conversely, in a light load condition when the level of the comparison reference voltage delivered from the amplifier 11 lowers, the third comparator 14 maintains the output thereof at an L level for a short period until the level of the ramp wave signal reaches the level of the comparison reference voltage, and then the output thereof is inverted to an H level.

Thus, the third comparator 14 inverts the output that has been set to an L level on the base of the timing of generating the ramp wave signal, at the timing corresponding to the magnitude of the output voltage Vout that indicates the load condition. The third comparator 14, before the oscillator 17 is reset and generates newly the ramp wave signal, sets its output again at an L level. Repeating this operation, the period of an L level of the output of the third comparator 14 varies corresponding to the magnitude of the output voltage Vout. Thus, the third comparator 14 delivers the output signal at an L level with a pulse width controlled corresponding to the output voltage Vout that indicates the load condition.

The reset preference type flip-flop circuit 19 is basically set by the pulse signal P delivered from the oscillator 17 synchronously with the timing of generating the ramp wave signal. The flip-flop circuit 19 is reset by the output of the third comparator 14. Consequently, the output Q of the flip-flop circuit 19 is at an H level only in the period from the timing of generating the ramp wave signal to the timing of inversion of the output of the third comparator 14. Thus, the output Q of the flip-flop circuit 19 is obtained, which is a pulse signal Pout with a PWM-controlled pulse width. The pulse signal Pout is given to the switching element SW through the driver circuit 21 to ON/OFF-control the switching element SW.

While the flip-flop circuit 19 normally operates as described above, when overcurrent is detected by the first comparator 12, the flip-flop circuit 19 is forcibly reset by the overcurrent detection signal at an H level from the first comparator 12. The forced reset of the flip-flop circuit 19 by the overcurrent detection signal inverts the output Q of the flip-flop circuit 19 into an L level. This forced reset of the flip-flop circuit 19 inhibits ON drive of the switching element SW through the driver circuit 21 to protect the switching element SW and the load against overcurrent.

The output Q of the flip-flop circuit 19 is also used to reset a restart timer 18. When zero current is detected by the second comparator 13, the restart timer circuit 18 in the state reset by the output Q of the flip-flop circuit 19 is set by the zero current detection signal delivered by the second comparator 13. The zero current detection signal is delay-controlled through a delay circuit 20 and given to the restart timer circuit 18 after timing adjustment. The restart timer circuit 18 delivers a restart timer signal after a certain time period since the comparator 13 has delivered the zero current detection signal.

In normal operation control, when zero current is detected by the second comparator 13, the oscillator 17 is reset by the zero current detection signal that is delay-controlled through the delay circuit 20. After that, the pulse signal P from the oscillator 17 is given to the flip-flop circuit 19. However, at the timing the flip-flop circuit 19 receives the pulse signal P, if the flip-flop circuit 19 has received the reset signal, the flip-flop circuit 19 misses a set timing. In order to set the flip-flop circuit 19 and invert the output Q into an H level in this case, the oscillator 17 may be, for example, reset again.

In this respect, the restart timer circuit 18, as described previously, delivers a restart timer signal after a certain period of time since setting by the zero current detection signal that is timing-regulated through the delay circuit 20. The restart timer circuit 18 gives the restart timer signal through an OR circuit 31 to the oscillator 17 to reset the oscillator 17. The delay time in the delay circuit 20 is determined corresponding to the set value of the resistor Rrt.

The above description gives a basic construction of the power supply IC 10 and the control operation in a normal operation.

Now a detailed description will be made about the operation of the switching power supply circuit 1 in the event of short-circuit of the bypass diode D2. In a normal operation in which the bypass diode D2 works normally, as shown in FIG. 6A, when the current detection voltage that is detected through the resistor Ris and given to the IS terminal of the power supply IC 10 becomes zero volts, the signal delivered from the OUT terminal of the power supply IC 10 becomes an H level. This signal turns the switching element SW ON, and the current detection voltage becomes negative as shown in FIG. 6A. The change of the negative voltage of the current detection voltage given to the IS terminal exhibits a gradient that depends on the inductance value of the inductance L and the voltage subjected to the inductance L. When the signal delivered from the OUT terminal becomes an L level, the current detection voltage given to the IS terminal rises toward zero volts.

Figure 5C:
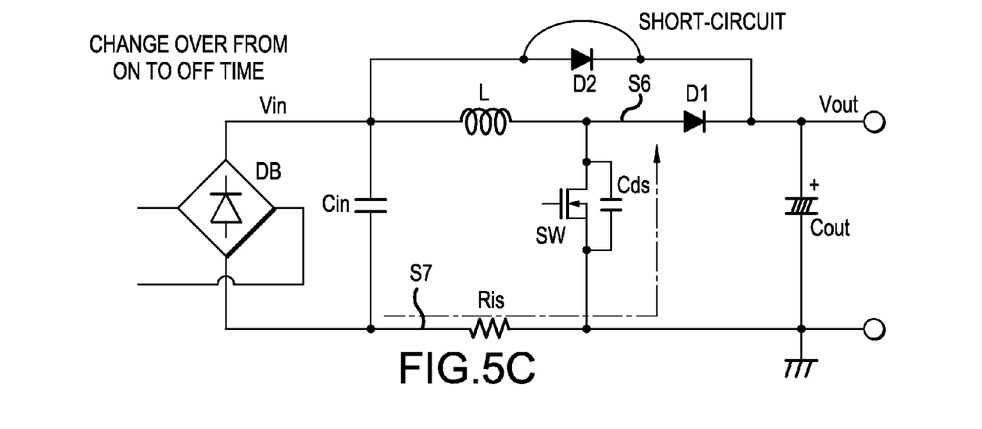

On the other hand, in the case the bypass diode D2 is short-circuited, a current flows, as shown in FIG. 5A, from the inductance L through the switching element SW in the period the switching element is in an ON state. This current stores energy in the inductance L. Then upon turning OFF of the switching element SW, a voltage appears at the drain of the switching element SW, the voltage being the forward voltage drop of the boost diode D1 superimposed on the output voltage Vout. At this time, a current flows, as shown in FIG. 5C, through a parasitic capacitance Cds between the source and drain of the switching element SW. Despite the OFF state of the switching element SW, a potential drop develops across the resistance Ris due to the current through the parasitic capacitance Cds. As a result, a positive current detection voltage is given to the IS terminal of the power supply IC 10. The positive current detection voltage gradually lowers toward zero volts in the period of OFF state of the switching element SW.

When the voltage at the IS terminal is positive immediately after turning OFF of the switching element SW, the power supply IC 10 judges a state of zero current detection. Accordingly, the power supply IC 10 turn-ON-drives the switching element SW after the timing adjusted by the delay circuit 20. Because the turning OFF period of the switching element SW is short in this case, the current flowing in the inductance L does not drop to zero.

As a consequence, a large current flows at the moment of turning ON of the switching element SW. This current drives to operate the overcurrent protection function in the power supply IC 10, which in turn promptly turns OFF the switching element SW. As a result, the inductance L remains holding the stored energy therein, and in this state, the switching element SW continues fast switching operation as shown in FIG. 6B. If this operational situation continues, the boost diode D1 would be abnormally heated rendering it overheat breakdown.

Embodiments of the present invention have been accomplished in view of the behavior of the switching power supply circuit 1 in the event of short-circuit of the bypass diode D2. In particular, in view of the voltage variation at the IS terminal in the OFF period of the switching element SW, the switching power supply circuit 1 of the invention is so constructed that the protection operation to the booster diode D1 is conducted seizing the phenomenon in which the voltage given at the IS terminal becomes positive.

More specifically, the power supply IC 10 comprises an operation frequency reducing means that detects short-circuit of the bypass diode D2 observing the voltage change at the IS terminal and lowers the switching frequency of the switching element SW upon the short-circuit detection. This operation frequency reducing means is composed, as shown in FIG. 1, of a bypass diode short-circuit detection circuit 22 that detects short-circuit of the bypass diode D2 observing the voltage variation at the IS terminal, and a bypass diode short-circuit protection circuit 23 that receives the output of the bypass diode short-circuit detection circuit 22 and forcibly resets the flip-flop circuit 19.

Figure 2:
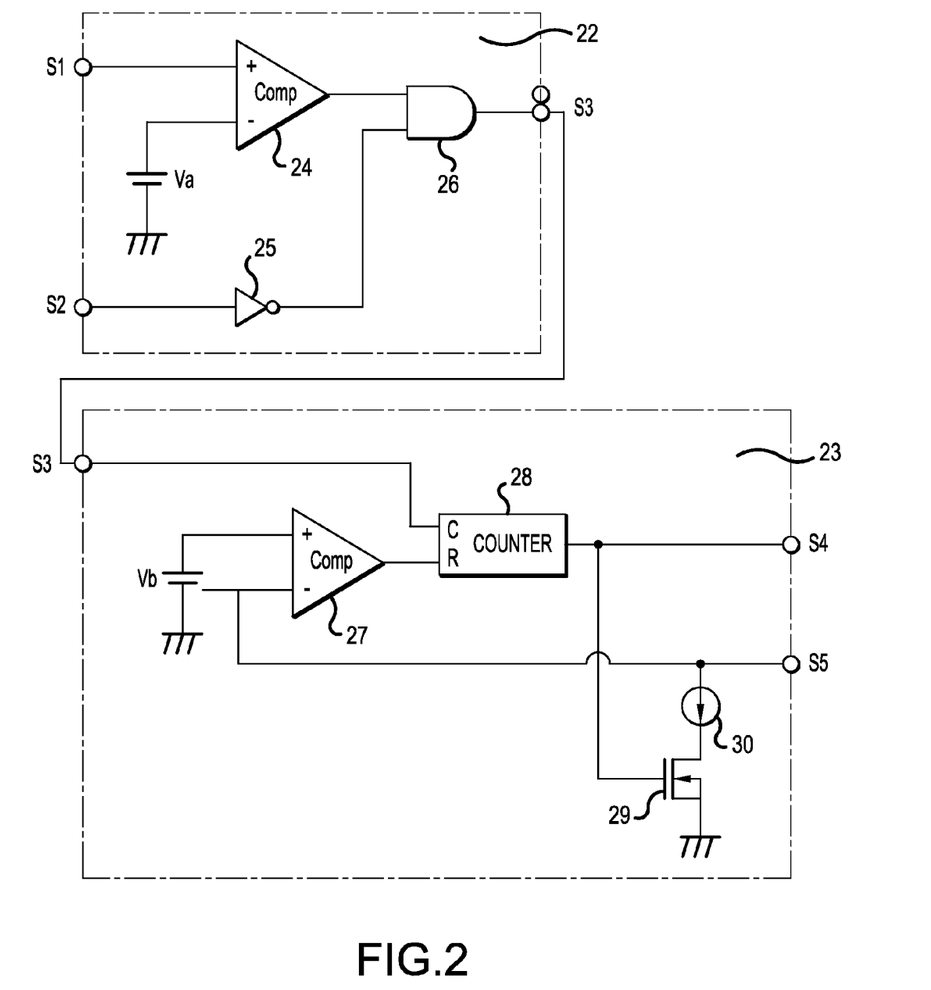
FIG. 2 shows an example of construction of a bypass diode short-circuit detection circuit and a bypass diode short-circuit protection circuit.

The bypass diode short-circuit detection circuit 22 has, as shown in FIG. 2 for example, a comparator 24 that compares a signal S1 delivered from the IS terminal through the level shift circuit 15 with a predetermined reference voltage Va. The signal S1 is the current detection voltage indicating the current flowing from the switching element SW through the resistance Ris. The comparator 24 delivers a signal at an H level when the signal S1 after the level shift exceeds the reference voltage Va, which means that the voltage detected through the IS terminal exceeds the bypass diode short-circuit detecting voltage. The bypass diode short-circuit detection circuit 22 further comprises a logic inversion circuit 25 that inverts the signal S2 delivered from the flip-flop circuit 19.

When the signal S2 is at an L level, which means the switching element SW is in an OFF state, and the comparator 24 delivers an H level signal, the bypass diode short-circuit detection circuit 22 delivers a short circuit detection signal S3 through an AND circuit 26 indicating short-circuit of the bypass diode D2. In other words, the bypass diode short-circuit detection circuit 22 detects and determines a short-circuit of the bypass diode D2 when a current flows through the switching element SW despite the OFF state of the switching element SW.

The bypass diode short-circuit protection circuit 23 has a comparator 27 that compares a signal S5 with a predetermined reference voltage Vb, in which the signal S5 is delivered by the amplifier 11 and given to the third comparator 14 as a comparison reference voltage. The comparator 27 delivers a signal at an H level when the signal S5 falls below the reference voltage Vb. The bypass diode short circuit protection circuit 23 also has a counter 28 that is reset by the output of the comparator 27 and counts the output signal S3 of the bypass diode short-circuit detection circuit 22.

Figure 3:
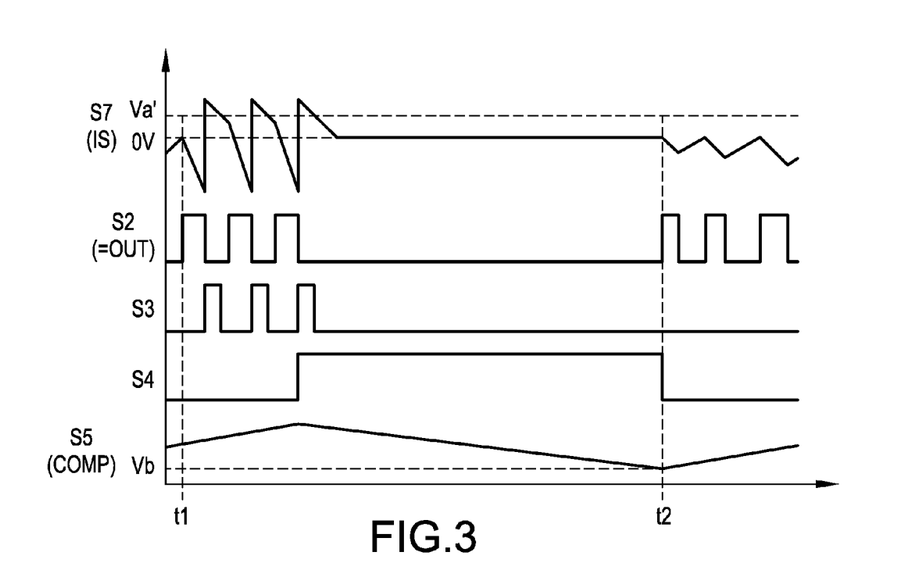
FIG. 3 shows waveforms to illustrate the protection operation in the event of bypass diode short-circuit.

The counter 28 counts the number of detecting the short circuit of the bypass diode D2 by the bypass diode short-circuit detecting circuit 22. When the counted number reaches three, for example, the counter 28 delivers, as shown in FIG. 3, a signal S4 at an H level to protect the boost diode D1. The counter 28 avoids a malfunction in the protection process due to erroneous detection of short-circuit of the bypass diode D2.

The bypass diode short-circuit protection circuit 23 further comprises a switch 29 composed of an n-channel MOS-FET that is ON-driven by the signal S4 at an H level delivered from the counter 28. The switch 29 forcibly drops the signal S5 delivered from the amplifier 11 to zero volts through a constant current source 30.

The signal S4 delivered by the bypass diode short-circuit protection circuit 23 constructed as described above, is delivered to the flip-flop circuit 19 through the OR circuit 32 as shown in FIG. 1. And the flip-flop circuit 19 is forcibly reset by the signal S4. The flip-flop circuit 19 may perform a reset operation even though a set signal and a reset signal are simultaneously given. Consequently, in the period in which short-circuit of the bypass diode D2 is detected and the signal S4 is at an H level, the flip-flop circuit 19 is never set even though a set signal P is given from the oscillator 17. Therefore, a driving signal for the switching element SW is not delivered from the OUT terminal, too.

Consequently, the ON/OFF driving the switching element SW is suspended when a short-circuit of the bypass diode D2 is detected. The switching element SW is prohibited from the fast switching operation in the situation the inductance L is holding energy without discharging it. Therefore, temperature rise in the boost diode D1 that would arise from fast switching operation of the switching element SW is prevented to avoid overheat breakdown of the boost diode D1.

Release from the protection operation on the boost diode D1, which started as described above, can be conducted as follows. When the signal S4 delivered from the counter 28 becomes an H level in this embodiment example, the switch 29 turns ON. Then, the capacitor Ccomp connected to the COMP terminal of the power supply IC 10 is discharged through the constant current source 30 decreasing the voltage level of the signal S5 as shown in FIG. 3.

The reference voltage Vb given to the comparator 27 is set at a lower value than the operation voltage range of the COMP terminal in normal operation. When the voltage level of the signal S5 falls below the reference voltage Vb, the output of the comparator 27 becomes an H level to reset the counter 28. This reset of the counter 28 releases the reset of the flip-flop circuit 19.

More specifically, as shown in FIG. 3 for example, when the signal S2 in phase with the signal delivered from the OUT terminal is at an L level, the signal S3 delivered by the bypass diode short-circuit detection circuit 22 becomes an H level if the signal S7 given from the IS terminal exceeds a reference voltage Va'. The reference voltage Va' is the reference voltage Va that is converted to a signal level before passing through the level shift circuit 15.

After repeating this operation three times, the output signal S4 of the counter 28 becomes at an H level. The signal S2 in phase with the signal delivered from the OUT terminal becomes an L level. At the timing the signal S4 becomes an H level, the capacitor Ccomp connected to the COMP terminal is discharged, decreasing gradually the voltage level of the signal S5. After that, at the timing the voltage level of the signal S5 decreased to the reference voltage Vb, the output signal S4 of the counter 28 becomes an L level. Thus, the reset of the flip-flop circuit 19 is released and the switching operation of the switching element SW is resumed.

When the reset of the flip-flop circuit 19 is released, if the short-circuit state of the bypass diode D2 has been removed, the switching power supply circuit returns to a normal operation control condition. However, if the short-circuit condition remains in the bypass diode D2, the short-circuit detection operation and the short-circuit protection operation are repeated. In this case, the switching element SW repeats switching operation under the short-circuited condition of the bypass diode D2 during the period from the release of the protection operation to the detection of short-circuit. This switching operation raises the temperature of the boost diode D1. Nevertheless, the time period of the switching operation of the switching element SW is shorter than the suspended time of the switching operation under the protection operation. Therefore, temperature rise in the boost diode D1 is restrained, preventing the boost diode D1 from overheat breakdown.

Thus, a switching power supply circuit 1 provided with the power supply IC 10 that is constructed and operates as described thus far, can cope with abnormal heating of the boost diode D1 effectively and readily. As a result, it is not necessary to use a plurality of diodes connected in parallel or to use a diode with a larger rated current carrying capacity than the rating required for normal operation. In addition, the short-circuit of the bypass diode D2 is detected according to the signal S1 detected through the IS terminal provided on the power supply IC 10 to conduct the protection operation to the boost diode D1. Consequently, it is unnecessary to change the number of pins for input and output terminals on the power supply IC 10. Therefore, the functions of the switching power supply circuit 1 may be enhanced without changing a printed circuit board mounting the power supply IC 10.

The present invention is not limited to the embodiment described thus far. For example, the protection operation can be released by reducing the driving voltage of the power supply IC 10 in the protecting operation to conduct initial reset of the power supply IC 10. The ON/OFF-driving of the switching element SW can be suspended by inhibiting output of the driver circuit 21 for a predetermined period of time using a dedicated timer circuit that is attached externally to the power supply IC 10.

Moreover, the operation mode itself of the power supply IC 10 can be changed on detecting short-circuit of the bypass diode D2 by elongating the delay time of the delay circuit 20, thereby reducing the switching frequency to avoid abnormal heating of the boost diode D1. Thus, the present invention can be varied and modified within the spirit and scope of the invention.

What is claimed is:
1. A switching power supply circuit comprising:
an inductance configured to receive a DC voltage;
a switching element that controls a current that flows through the inductance;
an output capacitor that stores an output voltage delivered from the inductance through a boost diode;

a switching control section that ON/OFF-controls the switching element, such that the current that flows through the inductance increases in an ON state of the switching element and the current that flows through the inductance decreases in an OFF state of the switching element;

a bypass diode that bypasses the inductance when the output voltage stored in the output capacitor decreases and delivers the DC voltage to the output capacitor; and an operation frequency reducing means for detecting a short-circuit of the bypass diode based on a current flowing through the switching element after a turning OFF of the switching element, and for reducing a switching frequency of the switching element upon the short circuit detection.

2. The switching power supply circuit according to claim 1, wherein the switching control section is configured to vary the switching frequency of the switching element according to the output voltage from the output capacitor and the current that flows through the inductance.

3. The switching power supply circuit according to claim 1, wherein the operation frequency reducing means comprises a bypass diode short-circuit detection circuit configured to detect the short-circuit of the bypass diode based on the direction of the current that flows through the switching element, and a bypass diode short-circuit protection circuit configured to inhibit, for a period of time, a generation of a pulse signal for ON/OFF-controlling the switching element according to an output of the bypass diode short-circuit detection circuit.

4. The switching power supply circuit according to claim 1, wherein the operation frequency reducing means comprises a bypass diode short-circuit detection circuit configured to detect the short-circuit of the bypass diode based on the direction of the current that flows through the switching element, and a bypass diode short-circuit protection circuit configured to suspend, for a period of time, application to the switching element, of a pulse signal that is delivered from the switching control section and ON/OFF-controls the switching element.

5. A switching power supply circuit comprising:

an inductance configured to receive a DC voltage;

a switching element that controls a current that flows through the inductance;

an output capacitor that stores an output voltage delivered from the inductance through a boost diode;

a switching control section that ON/OFF-controls the switching element, such that the current that flows through the inductance increases in an ON state of the switching element and the current that flows through the inductance decreases in an OFF state of the switching element, the switching control section comprising a bypass diode short-circuit detection circuit and a bypass diode short-circuit protection circuit; and a bypass diode that bypasses the inductance when the output voltage stored in the output capacitor decreases and delivers the DC voltage to the output capacitor, wherein the bypass diode short-circuit detection circuit is configured to detect a short-circuit of the bypass diode based on a direction of a current flowing through the switching element after a turning OFF of the switching element, and the bypass diode short-circuit protection circuit is configured to reduce a switching frequency of the switching element upon the short circuit detection.

6. The switching power supply circuit according to claim 5, wherein the switching control section is configured to vary the switching frequency of the switching element according to the output voltage from the output capacitor and the current that flows through the inductance.

7. The switching power supply circuit according to claim 5, wherein the bypass diode short-circuit protection circuit is configured to inhibit, for a period of time, a generation of a pulse signal for ON/OFF-controlling the switching element according to an output of the bypass diode short-circuit detection circuit.

8. The switching power supply circuit according to claim 5, wherein the bypass diode short-circuit protection circuit is configured to suspend, for a period of time, application to the switching element, of a pulse signal that is delivered from the switching control section and ON/OFF-controls the switching element.

\* \* \* \* \*